United States Patent
Hiller et al.

(10) Patent No.: US 8,618,704 B2
(45) Date of Patent: Dec. 31, 2013

(54) ELECTRIC MOTOR HAVING A BRAKING ELEMENT

(75) Inventors: Matthias Hiller, Aichtal (DE); Andreas Spielmann, Erkenbrechtsweiler (DE)

(73) Assignee: Metabowerke GmbH, Aichtal (DE)

( * ) Notice: Subject to any disclaimer, the term of this patent is extended or adjusted under 35 U.S.C. 154(b) by 95 days.

(21) Appl. No.: 13/138,761

(22) PCT Filed: Mar. 17, 2010

(86) PCT No.: PCT/EP2010/001655
§ 371 (c)(1),
(2), (4) Date: Sep. 23, 2011

(87) PCT Pub. No.: WO2010/108621
PCT Pub. Date: Sep. 30, 2010

(65) Prior Publication Data
US 2012/0013203 A1    Jan. 19, 2012

(30) Foreign Application Priority Data
Mar. 25, 2009  (DE) .......................... 10 2009 014 783

(51) Int. Cl.
*H02K 7/102*    (2006.01)
(52) U.S. Cl.
USPC .............................................. 310/77; 310/93
(58) Field of Classification Search
USPC ........... 310/77, 76, 92, 93, 123; 188/156, 158
IPC ............................ H02K 7/10,7/12, 7/106, 7/114
See application file for complete search history.

(56) References Cited

U.S. PATENT DOCUMENTS

| | | | |
|---|---|---|---|
| 2,959,695 A | 11/1960 | Huff | |
| 6,326,710 B1 * | 12/2001 | Guenther et al. | 310/77 |
| 6,731,034 B1 * | 5/2004 | Habele et al. | 310/77 |
| 7,138,737 B2 * | 11/2006 | Habele | 310/77 |

FOREIGN PATENT DOCUMENTS

| | | |
|---|---|---|
| DE | 538 902 | 11/1931 |
| DE | 847 933 | 8/1952 |
| DE | 198 33 445 A1 | 1/2000 |
| EP | 1 149 458 | 7/2000 |
| GB | 920485 | 12/1959 |
| WO | WO 2004/088820 A1 | 10/2004 |
| WO | WO 2004/088821 A1 | 10/2004 |

OTHER PUBLICATIONS

Oxford English Dictionary, Definition of the term "fulcrum", Mar. 22, 2013.*
Machine Translation, DE 847933, Aug. 28, 1952.*

* cited by examiner

*Primary Examiner* — Tran Nguyen
*Assistant Examiner* — Thomas Truong
(74) *Attorney, Agent, or Firm* — Paine Hamblen, LLP

(57) ABSTRACT

An electric motor is disclosed and which includes a braking element which is biasingly urged into a braking relationship relative to the electric motor, when the electric motor is deenergized, but which is further moved out of braking engagement when the electric motor is energized. The invention finds particular usefulness when used on hand tools, such as angle grinders.

8 Claims, 1 Drawing Sheet

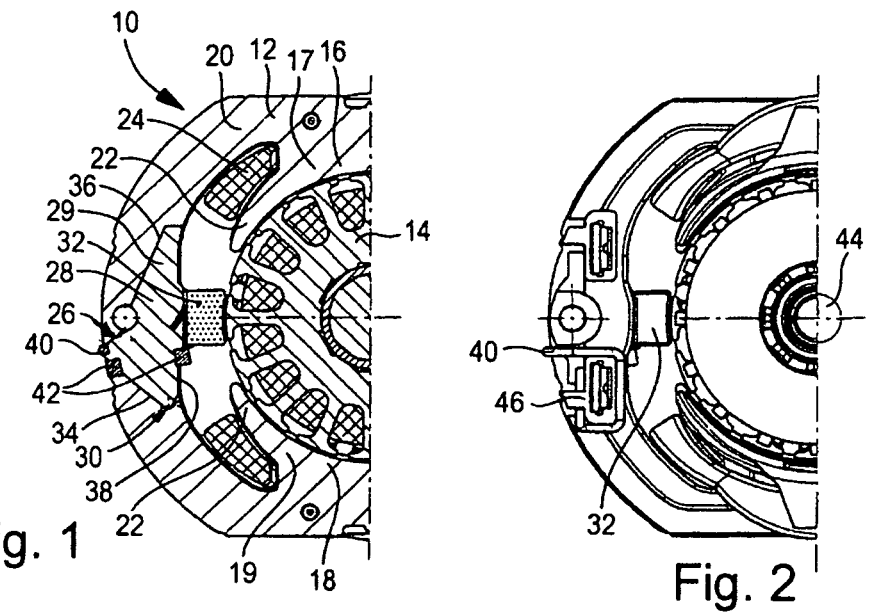
Fig. 1
Fig. 2
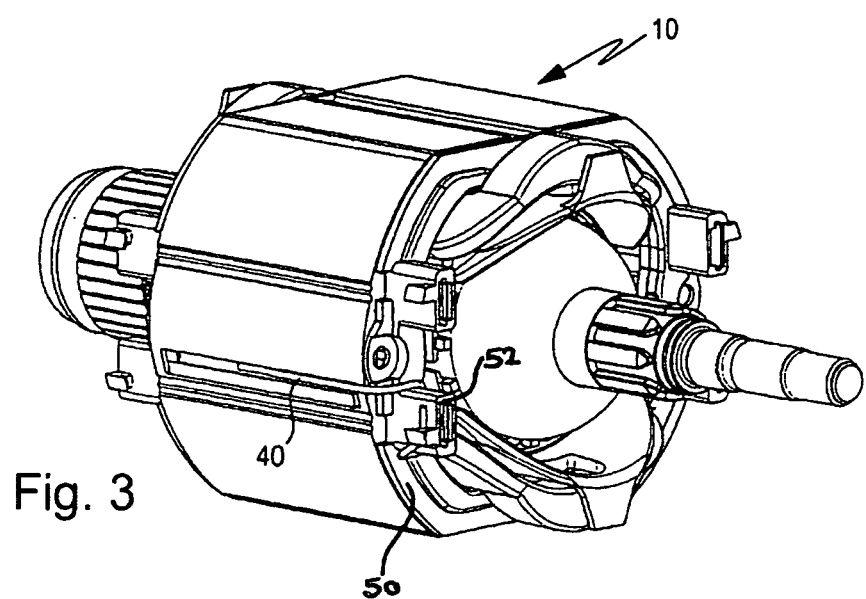
Fig. 3

ELECTRIC MOTOR HAVING A BRAKING ELEMENT

RELATED PATENT DATA

The present patent application claims priority from German Application Serial No. 10 2009 014 783.7, and which was filed on Mar. 25, 2009, PCT/EP2010/001655, and which was filed on Mar. 17, 2010.

The present invention relates to an electric motor with a brake driven by an electric motor, and in particular to an electric motor for use with angle grinders, which have a stator, and which further have at least one pole pair, with at least two poles each having a pole shoe which points inwardly towards a rotor, and wherein each pole shoe is surrounded by a winding. In this invention, the stator accommodates at least one braking device for braking the rotor, said braking device comprising a braking element. In this invention, it is possible for the braking element to be moved towards the outer circumference of the rotor for braking purposes and to be moved counter to a braking force by virtue of the magnetic field in the energized state of the electric motor, with the result that the braking device is released in the energized state of the electric motor.

Electric motors having an electromagnetic brake are already known from the prior art.

For example, GB 920,485 describes an electric motor with a housing, and poles, which are fixed in the housing, and a rotor and a magnetic braking element, which is arranged within the poles. The braking element brings about braking of the rotor when it is possible for a braking force to be applied to said braking element, or when it is not lifted off from the rotor by a force counteracting the braking force. The document describes a purely radially acting braking device, with the result that the maximum achievable braking effect is comparatively low.

A further electric motor with a brake is known from DE 847 933, and wherein the brake consists of a rocker-like arm of the stator. Still another electric motor in the form of a split-pole motor with a braking device is shown in DE 538 902; and wherein the brake lever of the braking device is fastened on the movable stator part of the motor in a rather complicated manner and is shifted thereby. In addition, a brake drum is provided, which is braked from the inside.

The reference EP 1 149 458 B1 describes an electric motor with an electromagnetic brake, and in particular to a device for use with an angle grinder, of the generic type, and wherein in this arrangement the braking device is accommodated in a pole and the braking element is in the form of a rocker, which is mounted movably about a pivot axis within a free space of the pole, and wherein the braking element is a multiple-armed lever with a braking arm, and a disengaging arm, and where it is possible for a braking force to be applied to the braking arm and a disengaging force, which is in the opposite direction to the braking force, being exerted on the braking element by the disengaging arm when the winding is energized. A similar motor with a braking device within a pole shoe is also disclosed in WO 2004/088821.

The object of the present invention is to provide an alternative configuration of an electric motor, in which a high braking force can be made available, and which can be produced efficiently and is reliable.

The present invention achieves this object by providing an electric motor having the features of claim 1, and wherein the braking device is arranged in the stator and located between two poles in the circumferential direction, and wherein the braking element is in the form of a single-armed brake lever, which is capable of being pivoted at one of its ends about a fulcrum in the stator, with the result that there is no need for a bearing arrangement of the brake lever by virtue of the provision of a shaft or spindle.

The bearing arrangement of the disclosed braking element is therefore provided not by way of a rotary spindle, but instead the braking element is mounted such that it can pivot about a fulcrum in the housing of the stator. In this case, the guidance takes place not by way of a rotary spindle, but advantageously by way of a slotted-link guide. The slotted link is formed by the stator housing. By virtue of the provision of a slotted-link guide in the yoke of the stator, and a single-armed brake lever, it is possible to dispense with a bearing arrangement provided by means of a shaft.

In the present invention, the fulcrum is provided at one end of the brake lever, and wherein the brake lever is guided with this end in the aforementioned slotted link in the stator, and can thus be pivoted.

The arrangement of the brake lever in the circumferential direction between the poles, and the pole shoes, opens up further degrees of freedom in terms of the construction since better access to the outer circumference of the rotor is provided thereby.

Furthermore, it has proven to be advantageous when the fulcrum of the brake lever is arranged on the exit side with respect to a brake lining of the brake lever and in the direction of rotation of the rotor. The rotation of the rotor in the braking mode, that is, in the de-energized state of the electric motor, is then such that the braking effect of the brake lever is reinforced by the rotor running onto the brake lining.

Provision is furthermore made for the braking element to consist of a magnetically conductive material in order to effect the opening of the brake during energization of the field by virtue of the magnetic force counteracting the braking force which presses the braking element against the rotor and thus lifts off the braking element from the rotor.

Furthermore, provision can be made for the braking element to have a brake lining on its side facing the rotor. The brake lining can be formed from a nonconductive material, which thus prevents a force from being applied to the brake lining when the field is energized in the direction of the rotor.

In this invention, provision can be made for the brake lining to have such a thickness in the radial direction that it bridges the gap between the stator and the rotor. Even in the state in which the brake lining is lifted off from the rotor, there is preferably only a small gap between the brake lining and the rotor. In the lifted-off state, the gap can correspond to the gap between the pole shoe and the rotor. Thus, it is only necessary for the braking element to travel a short distance when disengaging from the braking position.

Furthermore, provision can preferably be made for the braking force to be applied by a spring. In this case, the spring can extend substantially in the radial direction, as is provided in the prior art in accordance with EP 1 149 458 B1, for example. Furthermore, provision can be made for an axially extending spring which acts on the braking element with a braking force in the direction of the rotor. In this arrangement, it is possible for the spring to be in the form of a bar spring. Such a provision of a bar spring provides advantages over the use of a radial spring, as is described in the prior art, because it is no longer necessary for a plurality of spring elements to be provided. Alternatively, however, other springs or biasing elements can also be provided, for example radially acting springs, may be employed.

In the disclosure that is provided, it should be appreciated that the axial direction should always be understood to mean the axial direction of a motor shaft.

In this invention, more than one braking device may be provided. For example, in the case of a two-pole electric motor, provision can be made for braking devices to be provided on two mutually opposite sides and which are located between the poles. The braking devices are then generally rotationally symmetrical. In principle, provision can also be made for more than two poles to be provided, in which case one or more braking devices can be arranged between the poles. In this arrangement, the braking devices which are arranged between the poles are not in any event surrounded by the field windings and which surround the pole shoe.

In one form of the invention, the face of the braking element to which the brake lining is applied, and which points in the direction of the rotor to continue the contour of the stator which surrounds the braking element. That is to say that, in this case, only the brake lining bridges the gap between the stator and the rotor. For this purpose, the brake lining needs to have a sufficient thickness in the radial direction.

Furthermore, provision can be made for at least one squirrel-cage windings to be provided on the brake lever.

In the aforementioned arrangement, the squirrel-cage winding serves the purpose of preventing the lever and therefore the brake from wobbling during AC operation.

In one form of the invention, the braking device can be arranged on the entry side, for example, with respect to the direction of rotation of the rotor. In this arrangement, it has a self-energizing effect. In the reverse arrangement with respect to the direction of rotation, the braking force is only determined by the spring force. However, in this arrangement it is easier to monitor the opening and closing of the braking device.

In one form of the invention, the braking element can extend in the axial direction over the entire length of the stator or only over part thereof. In particular, provision can be made for it to extend over approximately the entire axial length and for there to be no braking element provided at the two ends of the stator, and in the axial direction for reasons of stability.

Furthermore, the invention relates to an electric handtool device, and in particular an angle grinder, having an electric motor of the abovementioned type.

Further advantages and features will be understood from the rest of the present application. The invention will be further explained, in more detail, below, by reference to the attached drawing, and wherein:

FIG. 1 a partial, transverse vertical sectional view taken through an electric motor of the present invention.

FIG. 2 is a fragmentary plan view taken in the axial direction of an electric motor of the present invention.

FIG. 3 is a perspective side elevation view of an electric motor of the present invention.

DETAILED DESCRIPTION

In FIG. 1, an electric motor is denoted by the reference symbol 10, and wherein only the left-hand half (in the illustration) is shown of the electric motor 10. The right-hand half of the electric motor 10 is understood to be rotationally symmetrical. The electric motor in this case comprises a stator 12, and a rotor 14. The stator 12 comprises a pole pair, of which a first pole is denoted by the reference symbol 16 and a second pole is denoted by the reference symbol 18. The poles 16, 18 are diametrically opposite one another. The poles 16, 18 in this case comprise pole shoes 17, 19, which are supported and extend inwardly from a yoke 20 and in the direction of the rotor. Each pole has two pole tips 22, with only one pole tip 22 being shown per pole shoe 17, 19 in FIG. 1. Windings 24, are located in an internal space formed by the gap which exists between the pole tip 22 and the yoke 20. The windings do not protrude beyond the ends of the pole tips 22 in the circumferential direction, and are provided between the pole tips 22 and the yoke 20.

In this case, the rotor 14 preferably rotates in the clockwise direction. However, provision can also be made for there to be a reverse direction of rotation.

The respective windings 24 therefore surround the respective pole shoes 17, 19, respectively.

A braking device 26, which comprises a braking element 28 and which is depicted in the form of a single-armed brake lever 29, is provided in a circumferential location and is oriented between the two poles 16, 18. In this case, the brake lever 29 is mounted such that it can rotate about a fulcrum 30 in the stator 12. The fulcrum 30 is provided at one end of the single-armed brake lever 29, and wherein the guidance of the brake lever 29 in the stator 12 is realized via a slotted-link guide. In this invention, it is no longer necessary for the brake lever 29 to be mounted by means of a shaft within the stator 12.

The brake lever 29 mounts a brake lining 32, which is lifted off or slightly spaced from the rotor 14 in the state illustrated, with the result that there is a slight gap between the brake lining 32 and the rotor 14. The gap between the brake lining 32 and the rotor 14 corresponds or is similar to the gap provided between the rotor 14 and the pole shoes 17, 19. The brake lining 32 is arranged on that side 38 of the brake lever 29 which points towards the rotor 14.

In this case, the brake lining 32 is arranged in such a way that it is capable of applying a radially directed braking force to the rotor 14. It is located centrally on the brake lever 29, and does not extend over the entire length of the lever arm of the brake lever 29.

The material forming the brake lining 32 is fabricated from a substantially magnetically, nonconductive material. On the other hand, the material forming the brake lever 29 is fabricated from a magnetically conductive material. In this arrangement, the brake lever 29 forms two contact faces 34 and 36 with the stator 12. If pivoting of the brake lever 29 about the fulcrum 30 takes place, the contact faces 34 and 36 are lifted off from the associated faces of the stator 12, with the result that a slight gap is produced by this movement. As a result of this slight movement, the brake lining 32 comes to bear a radial force against the rotor 14.

Furthermore, the brake 29 has a face 38, which points in the direction of the rotor 14. The face 38 generally follows the contour or exterior shape of the stator 12.

For the application of a braking force, a spring 40 is provided which runs substantially in the axial direction of the electric motor 10, with the result that the spring 40 bears against the brake lever 29 over its axial extent and applies a radially directive force inwardly onto said brake lever over substantially the entire length thereof, with the result that the brake lever 29 is pressed against the outer circumference of the rotor 14. The fitting of the spring 40 is in this case is best seen in FIGS. 2 and 3. The spring is in this case a bar or leg spring.

If the electric motor 10 is now switched on, i.e. the windings 24 are energized, a magnetic flux is induced in the stator 12, and this magnetic flux results in the contact faces 34 and 38 being drawn close to the associated corresponding faces of the stator 12 and thus coming to bear against said faces. In the process, the contour of the contact faces 34 and 36 precisely follows the contour of the stator 12 in this region. This force counteracts the braking force provided by the spring 40 which exerts a force radially inwardly. As should be understood, the force induced by the magnetic flux is greater in terms of the magnitude of the braking force caused by the spring 40, with the result that the brake lining 32 comes out of contact with the rotor 14. For this purpose, the brake lever 29 performs a limited pivoting movement about the fulcrum 30. This movement is sufficient for lifting or displacing the brake lining 32 off or away from the rotor 14. In the process described, above, the faces of the brake lever attempt to close the gap between them and the circumferential faces of the stator 12.

Furthermore, a at least one squirrel-cage winding 42 is provided and which operates to prevent any vibration of the braking device 26 when the winding 24 is energized, which would result in the brake lining 32 coming into contact temporarily again and again with the rotor 14 and would result in the brake wobbling and noise being developed.

If the electric motor 10 is switched off, the magnetic effect of the windings 24 diminishes and therefore so do the forces which hold the brake lever 28 with its contact faces 34 and 36 firmly against the corresponding faces of the stator 12. The braking force applied by the spring 40 then exceeds the aforementioned force which lifts the brake lining 32 off from the rotor 14, with the result that the brake lining 32 is pressed against the rotor 14 under the spring force of the spring 40. In this state, there is a slight gap between the contact faces 34 and 36 and the associated faces of the stator as earlier discussed.

As a result of the release of force the brake lining 32 is pressed against the rotor resulting in the rotor 14 being braked. As can be appreciated, the braking device 26 is automatically triggered when the motor 10 is switched off.

FIG. 2 shows a fragmentary, plan view of an electric motor 10, as is illustrated in the perspective side elevation view of FIG. 3. The drive shaft of the electric motor is in this case denoted by the reference symbol 44.

As will be appreciated, identical components parts are denoted by identical reference symbols, with the fastening of the spring 40 being shown here. As can be seen, the spring is fixed on a component part 46, with the result that it exerts a substantially radially, inwardly directed force on the braking element 28. The arrangement of the spring 40 can also be seen in FIG. 3. The spring 40 is fixed in this case in a so-called coil supporting head 50, and wherein the contact-making elements 52, which are unused here, are used for fixing or orienting the spring and for other accommodating purposes.

The abovementioned configuration makes it possible to provide an electric motor 10, in which a simple bearing arrangement of a braking device 26 and which is located outside of the poles 16, 18 is possible, with it being possible to dispense with a bearing arrangement located about a pivot.

This is particularly advantageous in the case of an angle grinder, in which a cutting disk is intended to be braked as quickly as possible when the motor 10 is switched off in order that there is no notable overrun of the cutting disk once the motor 10 has been switched off since this is associated with a high potential risk of damage to an associated work piece, or injury to a worker. It is therefore possible to ensure in the abovementioned way that a cutting disk of an angle grinder is always stopped as quickly as possible when the motor 10 is switched off.

The invention claimed is:

1. An electric motor having a stator which has at least one pole pair with at least two poles, and wherein each pole has a pole shoe directed inwardly towards a rotor having a circumference, said shoe further being surrounded by a winding comprising:

a braking element movably mounted on the stator and which is moved towards the circumference of the rotor for braking purposes, and is moved counter to the braking force by virtue of a magnetic field which is generated when the electric motor is energized, and wherein the braking device is arranged in the stator and located between the two poles and in the circumferential direction, and wherein the braking element is in the form of a one-armed brake lever which is capable of being pivoted at one of its ends about a fulcrum in the stator; and an axially extending spring is provided, and which acts on the braking element with a braking force which is exerted in the direction of the rotor, and wherein the spring comprises a bar spring.

2. The electric motor as claimed in claim 1, and wherein the braking element is fabricated, at least in part of a magnetically conductive material.

3. The electric motor as claimed in claim 1, and wherein the braking element has a brake lining on a side facing the rotor, said brake lining being fabricated, at least in part, of a magnetically nonconductive material.

4. The electric motor as claimed in claim 1, and wherein the spring comprises a radially acting spring.

5. The electric motor as claimed in claim 1, and wherein more than one braking device is provided.

6. The electric motor as claimed in claim 1, and wherein a face of the brake lever has a shape similar to contour surface of the stator which surrounds the braking element.

7. The electric motor as claimed in claim 1, and wherein at least one squirrel-cage winding mechanically cooperates with the braking element.

8. An electric motor comprising:

a rotor having a circumscribing peripheral edge;

a stator positioned radially, outwardly, and in spaced relation relative to the rotor, and which has an inwardly facing surface having a given contour;

a one-armed brake lever which is capable of being pivoted at one of its ends about a fulcrum on the stator, and which is radially moveable inwardly towards the stator, and wherein the brake lever has an inwardly facing peripheral edge;

a brake lining mounted on the inwardly facing peripheral edge of the brake lever, and which is operable to frictionally engage the circumscribing peripheral edge of the rotor when the brake lever is moved radially inwardly relative to the stator;

a radially acting bar spring extends axially and borne by the stator, and which urges the brake lever radially inwardly relative to the stator, and to cause the brake lining to frictionally engage the circumscribing peripheral edge of the rotor when the electric motor is deenergized; and a winding which is located between the rotor, and the stator, and wherein energizing the winding causes a magnetic field to be generated which is effective in moving the braking lever radially inwardly relative to the stator, and which further overcomes the force of the biasing radially acting bar spring so as to move the brake lining out of frictional engagement with the circumscribing peripheral edge of the rotor, and wherein deenergizing the winding allows the brake lining, under the influence of the radially acting bar spring to move back into frictional engagement relative to the rotor.

* * * * *

UNITED STATES PATENT AND TRADEMARK OFFICE
CERTIFICATE OF CORRECTION

Page 1 of 1

PATENT NO. : 8,618,704 B2
APPLICATION NO. : 13/138761
DATED : December 31, 2013
INVENTOR(S) : Matthias Hiller et al.

It is certified that error appears in the above-identified patent and that said Letters Patent is hereby corrected as shown below:

On the title page, item 73 Assignee: Please replace "Metabowerke GmbH, Aichtal (DE)" with --Metabowerke GmbH, Nuertingen (DE)--.

In the specification

Column 3, line 20, please replace "one squirrel-cage windings" with --one squirrel-cage winding--.

Column 5, line 9, please replace "a at least one" with --at least one--.

Signed and Sealed this
Sixteenth Day of February, 2016

Michelle K. Lee
*Director of the United States Patent and Trademark Office*

UNITED STATES PATENT AND TRADEMARK OFFICE
CERTIFICATE OF CORRECTION

PATENT NO. : 8,618,704 B2
APPLICATION NO. : 13/138761
DATED : December 31, 2013
INVENTOR(S) : Matthias Hiller et al.

Page 1 of 1

It is certified that error appears in the above-identified patent and that said Letters Patent is hereby corrected as shown below:

TITLE PAGE: Item 73

Assignee: Please replace "Metabowerke GmbH, Aichtal (DE)" with "--Metabowerke GmbH, Nuertingen (DE)--." (as corrected to read in the Certificate of Correction issued February 16, 2016) is deleted and patent is returned to its original state with the applicant & assignee name in patent to read --Metabowerke GmbH, Aichtal (DE)--

Signed and Sealed this
Seventeenth Day of May, 2016

Michelle K. Lee
*Director of the United States Patent and Trademark Office*